United States Patent
Hessler et al.

(10) Patent No.: US 8,971,271 B2
(45) Date of Patent: Mar. 3, 2015

(54) METHODS AND NETWORK NODES FOR SCHEDULING TRANSMISSION

(75) Inventors: Martin Hessler, Linköping (SE); Erik Eriksson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 150 days.

(21) Appl. No.: 13/637,405

(22) PCT Filed: May 11, 2012

(86) PCT No.: PCT/SE2012/050500
§ 371 (c)(1),
(2), (4) Date: Sep. 26, 2012

(87) PCT Pub. No.: WO2013/115690
PCT Pub. Date: Aug. 8, 2013

(65) Prior Publication Data
US 2013/0195031 A1 Aug. 1, 2013

Related U.S. Application Data

(60) Provisional application No. 61/592,176, filed on Jan. 30, 2012.

(51) Int. Cl.
*H04W 72/04* (2009.01)

(52) U.S. Cl.
USPC .......................................................... 370/329

(58) Field of Classification Search
CPC ... H04L 1/1819; H04L 1/1893; H04L 1/1896; H04W 72/0406
USPC .......................................................... 370/329
See application file for complete search history.

(56) References Cited

U.S. PATENT DOCUMENTS

| | | | |
|---|---|---|---|
| 2003/0118031 A1* | 6/2003 | Classon et al. | 370/395.54 |
| 2009/0028129 A1* | 1/2009 | Pi et al. | 370/351 |
| 2012/0020321 A1* | 1/2012 | Higuchi et al. | 370/330 |
| 2012/0063400 A1* | 3/2012 | Papasakellariou et al. | 370/329 |
| 2012/0163319 A1* | 6/2012 | Roessel et al. | 370/329 |

FOREIGN PATENT DOCUMENTS

WO 2008005503 A2 1/2008

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 10)", 3GPP TS 36.212 V10.0.0, Dec. 2010, 1-72.

(Continued)

*Primary Examiner* — Charles C Jiang
*Assistant Examiner* — Thad Defauw
(74) *Attorney, Agent, or Firm* — Murphy, Bilak & Homiller, PLLC

(57) ABSTRACT

A radio network node (110) configured to schedule transmission between the radio network node (110) and a user equipment (120) and a method therein as well as a user equipment (120) configured to receive a scheduling grant for a transmission between the user equipment (120) and the radio network node (110) and a method therein are provided. The radio network node (110) determines (201) a transport block size scaling factor. Next, the radio network node (110) determines (206) a scheduling grant for the transmission based on the transport block size scaling factor. Furthermore, the radio network node (110) sends (207) the transport block size scaling factor and the scheduling grant to the user equipment (120).

25 Claims, 8 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.4.0, Dec. 2011, 1-125.

Parkvall, Stefan et al., "WCDMA Enhanced Uplink—Principles and Basic Operation", IEEE 2005, 1411-1415.

* cited by examiner

METHODS AND NETWORK NODES FOR SCHEDULING TRANSMISSION

TECHNICAL FIELD

Embodiments herein relate to methods and network nodes in a wireless telecommunication system. More particularly, a radio network node for scheduling transmission between the radio network node and a user equipment and a method therein as well as a user equipment for receiving a scheduling grant for a transmission between the user equipment and the radio network node and a method therein.

BACKGROUND

Many modern cellular communication systems, such as High Speed Pack Access (HSPA) and Long Term Evolution (LTE), use automatic link adaptation to achieve efficient communication under varying radio conditions. The effective bit rate is varied quickly depending on the radio conditions. As the effective bit rate varies also related transmission parameters, such as code rate and modulation scheme, are varied. When the radio conditions become worse, the bit rate is decreased to reduce the probability of decoding error at a receiver. When the radio conditions become better, the bit rate is increased to increase the transmission throughput without causing a too high error probability. The radio conditions are often predicted based on past measurements on a radio channel for which the radio conditions are to be estimated.

When the receiver fails in its attempt to decode a transport block, it typically stores the received signal (or a processed version of it), and combines it with a later received signal for a retransmission of that block. This is known as soft combining. The soft combining greatly increases the probability of a correct decoding. Known variants of soft combining are Chase combining and incremental redundancy.

In many Hybrid Acknowledgement Response reQuest (HARQ) protocols, the receiver sends HARQ feedback, after each decoding attempt, in the form of a positive acknowledgement (ACK) or negative acknowledgement (NACK). In this manner, it is indicated to a transmitter if the particular transport block was correctly decoded or not. In case a NACK is sent, the transmitter typically retransmits the transport block. In the case of ACK, the transmitter can instead use its resources to transmit new data, to the same or a different user equipment (UE).

In both HARQ variants, the receiver must perform a complete decoding attempt before it can decide upon its next action. Modern error-correcting codes, such as Turbo codes, are very complex to decode, resulting in long delays from transmission until a message can be sent back to the transmitter. This results in long round-trip delays of the HARQ retransmissions. For example in LTE, the minimum round-trip delay is 8 ms for downlink transmissions. Hence, this limits how fast retransmissions can be made and also implies a limitation in how aggressive modulation and coding can be used without losing performance. Hence, it is often optimal to use conservative link adaptation.

It is well-known that HARQ with soft combining can be viewed as a kind of (implicit) link adaptation mechanism. This is the case if the link-adaptation is chosen so high that one or more retransmissions are often needed. The effective bit rate of the entire transmission of a transport block then depends on the number of transmissions (including original and retransmissions) as well as transport format parameters such as modulation and code rate.

The effective bit rate is then a function of the link adaptation chosen for the transmission and the number of retransmissions needed.

A known cellular radio communication system comprises a radio base station and a user equipment. The radio base station obtains information about channel conditions and schedules transmissions to/from the user equipment accordingly. In scenarios, where the channel conditions vary rapidly with respect to the minimum round-trip delay mentioned above, it may be a problem that the scheduling, including amongst others link adaptation, cannot follow the variations of the channel condition. As a consequence, performance may degrade.

SUMMARY

An object is to improve performance of a cellular radio communication system.

According to an aspect, the object is achieved by a method in a radio network node for scheduling transmission between the radio network node and a user equipment. The radio network node determines a transport block size scaling factor. Next, the radio network node determines a scheduling grant for the transmission based on the transport block size scaling factor. Furthermore, the radio network node sends the transport block size scaling factor and the scheduling grant to the user equipment. In this manner, the radio network node schedules the transmission by means of the scheduling grant.

According to another aspect, the object is achieved by a radio network node configured to schedule transmission between the radio network node and a user equipment. The radio network node comprises a processing circuit configured to determine a transport block size scaling factor. Moreover, the processing circuit further is configured to determine a scheduling grant for the transmission based on the transport block size scaling factor. The radio network node further comprises a transmitter configured to send the transport block size scaling factor and the scheduling grant to the user equipment. In this manner, the radio network node is configured to schedule the transmission by means of the scheduling grant.

According to a further aspect, the object is achieved by a method in a user equipment for receiving a scheduling grant for a transmission between the user equipment and a radio network node. The user equipment receives a transport block size scaling factor and a scheduling grant from the radio network node.

According to yet another aspect, the object is achieved by a user equipment configured to receive a scheduling grant for a transmission between the user equipment and a radio network node. The user equipment comprises a receiver configured to receive a transport block size scaling factor and a scheduling grant from the radio network node.

Thanks to that the radio network node determines the transport block scaling factor, the radio network node encodes, i.e. performs channel coding on, more user data than what would be encoded according to a transport block size alone when the transport block size scaling factor is greater than one. As a consequence, the transmission may need to be spread over one or more transmission timing intervals (TTIs). Next, the radio network node determines the scheduling grant based on the transport block scaling factor. When channel conditions vary largely between these TTIs, the spreading of the transmission over these TTIs means that the transmission needs to adapt to an average channel condition for these TTIs. Thus, enabling the radio network node to schedule the transmission while using a less robust modulation and coding scheme. The less robust modulation and coding scheme implies, in turn, that more data can be sent in a TTI and therefore a higher bit rate is achieved.

An advantage is thus that throughput may be improved. Further advantages are that the signalling load is lowered and that coverage is improved while keeping the delay at a reasonable level.

These advantages are obtained due to better link-adaptation as it is sufficient to estimate an average channel quality over the transmission timing intervals (TTIs) over which the transport block, or transmission, is spread. Further, with the possibility to do transport block size scaling, it is possible to obtain better spectral efficiency for transmissions over a sequence of TTIs. Improved diversity is obtained, in frequency and/or time.

Moreover, when the same user equipment is scheduled in consecutive TTIs, improved channel knowledge and hence further improved link-adaptation may be obtained.

From an implementation stand-point, this also implies faster calculations in the radio network node as soft-buffers for user equipments and state information don't need to be shuffled as much as buffers for user equipments that are initiated and emptied in consecutive TTIs.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
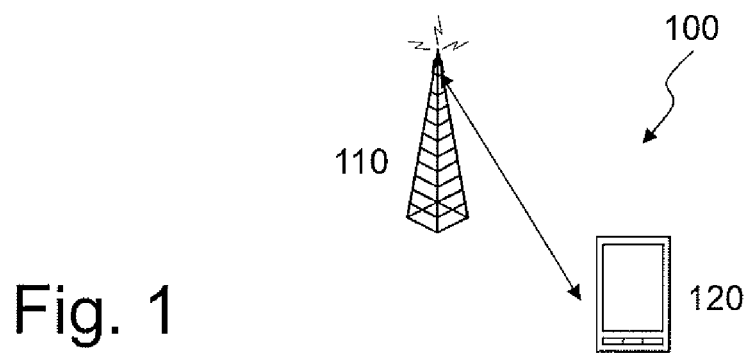
FIG. 1 is a schematic overview of an exemplifying radio communication system in which exemplifying methods according embodiments herein may be implemented.

Throughout the following description similar reference numerals have been used to denote similar elements, network nodes, parts, items or features, when applicable. In the Figures, features that appear in some embodiments are indicated by dashed lines.

The following analysis of existing solutions is meant to facilitate understanding of benefits and advantages of the embodiments presented in the subsequent description with reference to the Figures.

In existing solutions, the HARQ-roundtrip time limits the performance and during strongly varying unpredictable radio conditions the good radio conditions cannot be harvested into throughput for the user equipments. TTI-bundling according to prior art is adapted to uplink transmission. This is partly because of the delay and overhead associated with doing retransmissions in current LTE standard and that current Modulation and Coding Scheme tables (MCS-tables) are designed to maximize spectral efficiency for a single TTI, not for the TTI-bundled case. According to TTI-bundling for the uplink, the same data is resent over the TTIs comprised in a TTI bundle. Error correction at the receiver takes advantage of the repeated data in the TTI bundle in order to correctly decode the received data.

Because of the nature of radio channels, and the behaviour of interference from other transmitters, it is difficult to make an accurate prediction of the radio conditions for a particular transmission. This makes it necessary to apply a significant margin against sudden variations in order to keep the probability of decoding error acceptably low. Such a margin reduces the average throughput.

Hence, two problems with the existing solutions is that the HARQ-roundtrip time limits the performance and that during strongly varying unpredictable radio conditions the good radio conditions cannot be harvested into throughput for the users. This is because of the delay and overhead associated with doing retransmissions in current LTE standard combined with that the transmission may be interference limited.

In order to overcome these problems, a transport block size scaling factor is introduced as disclosed herein. As mentioned above, the transport block size scaling factor may spread the transmission over one or more TTIs. Thus, when determining the MCS for the transmission the average channel quality for these TTIs will be taken into account. Hence, the radio network node is allowed to use a less robust modulation and coding scheme as indicated by the average channel quality. As a result, especially in situations where the channel conditions vary rapidly, an increased code rate and throughput may be obtained.

FIG. 1 shows an exemplifying radio communication system 100, such as an LTE system, in which embodiments herein may be implemented. The radio communication system 100 comprises a radio network node 110, such as an eNB (evolved Node B or eNodeB), and a user equipment 120.

The user equipment 120 may be a mobile phone, a cellular phone, a Personal Digital Assistant (PDA) equipped with radio communication capabilities, a smartphone, a laptop equipped with an internal or external mobile broadband modem, a portable electronic radio communication device, a tablet PC, a sensor device including a transceiver or the like. The sensor device may detect temperature, pressure, speed or any other measurable entity.

The radio network node 110 may in some examples be a radio network controller, a radio base station controller, a radio base station, an eNB, NB or the like.

A transmission time interval (TTI) may be a subframe, which may have a duration of 1 ms in an LTE system. In other examples, the TTI may referred to as a time slot, a time period, a frame, a scheduling interval, a scheduling period or the like.

Figure 2:
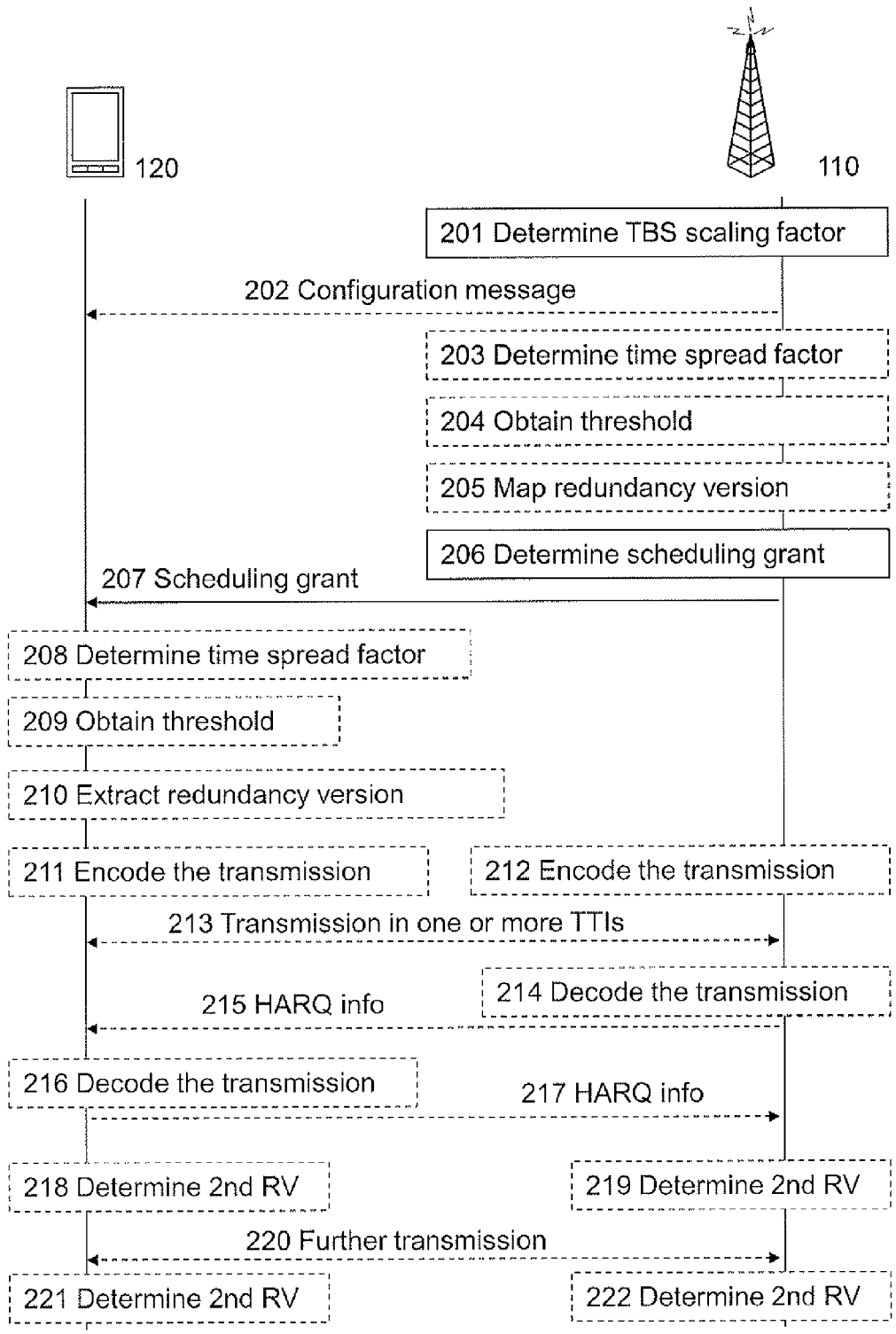
FIG. 2 is a schematic, combined signalling scheme and flowchart, illustrating the exemplifying methods performed in the radio communication system according to FIG. 1.

FIG. 2 shows an exemplifying method according to embodiments herein, when implemented in the radio communication system 100 of FIG. 1. The radio network node 110 may perform a method for scheduling a transmission to be transmitted between the radio network node 110 and the user equipment 120. The user equipment 120 may perform a method for receiving a scheduling grant for a transmission between the user equipment 120 and the radio network node 110.

Each of the actions in FIG. 2 will be explained with reference to a downlink scenario and an uplink scenario. The downlink scenario relates to when the transmission is a downlink transmission and the scheduling grant is a downlink assignment. The uplink scenario relates to when the transmission is an uplink transmission and the scheduling grant is an uplink grant. If not otherwise noted, or evident from the context, any action below applies to both the uplink and the downlink scenario.

The following actions may be performed. The order in which the actions are presented is provided as an example. In other examples, the order may differ from what is presented here and in the Figures.

Action 201

The radio network node 110 determines a transport block size scaling factor in order to harvest radio conditions which would remain unexploited due to the 8 ms HARQ-roundtrip time as explained above.

The determining of the transport block size scaling factor may be based on one or more:
- amount of data to be scheduled,
- variation of channel quality of one or more upcoming transmission timing intervals (TTIs), onto which the transmission is to be scheduled, and
- delay sensitivity of data to be scheduled.

Amount of data to be scheduled may refer to amount of user data in a send buffer of the user equipment 120, in case of the uplink scenario, or a send buffer of the radio network node 110 in case of the downlink scenario.

Variation of channel quality of one or more upcoming TTIs may relate to expected, or predicted, variation of channel quality. Expected variation of channel quality may be determined by the radio network node 110 according to known methods. For example, the radio network node 110 may assume the variation to be the same as for some set of previous TTIs, in which the variation have been measured.

Delay sensitivity of data to be scheduled may relate to desired Quality of Service (QoS) for the data to be scheduled. For example, QoS for a first data set may be higher than QoS for a second data set. Then, this may indicate that the first data set is more sensitive to delay than the second data set. Delay sensitivity of data may also be related to the type of data, such as VoIP, streaming video, file transfer etc. Then, VoIP data would be more delay sensitive than file transfer data.

Action 202

In order for the user equipment 120 to be able to make use of the transport block size scaling factor, the user equipment 120 needs to be informed about the transport block size scaling factor. Thus, the radio network node 110 may send the transport block size scaling factor during configuration to the user equipment (120). A configuration message may comprise the transport block size scaling factor.

In LTE, the configuration may be provided by Radio Resource Control (RRC) signalling.

In action 207 below, another way of informing the user equipment 120 about the transport block size scaling factor is presented.

Action 203

In a first set of embodiments, a number of TTIs over which the transmission is spread, as caused by the transport block size scaling factor, is defined by a time spreading factor, or time spread factor for short in FIG. 2.

Therefore, in the first set of embodiments, the radio network node 110 may determine a time spreading factor based on the transport block size scaling factor. The time spreading factor indicates a number of consecutive transmission time intervals, "TTIs", over which the transmission is to be transmitted, or spread. As an example, the time spreading factor may be equal to the transport block size scaling factors. In section "time spreading factor" below, the use of the time scaling factor will be further elaborated.

In prior art, TTI-bundling is used in combination with soft combining. With TTI-bundling, a repetition factor is used to indicate a number of TTIs on which the same information bits are to be transmitted in order to reduce signalling for scheduling. In each TTI of the number of TTIs different redundancy versions is used. It shall here be noted that each TTI in TTI-bundling may be decoded since each TTI comprises an entire transport block, having a given transport block size. The transport block size is the same for each TTI in a TTI-bundle.

Action 204

In a second set of embodiments, the number of TTIs over which the transmission is spread is defined by a threshold for indicating a number of modulated symbols. In the uplink scenario, the symbols are modulated by the user equipment 120. In the downlink scenario, the symbols are modulated by the radio network node 110.

In these embodiments, the radio network node 110 may obtain the threshold. For example, the radio network node 110 may determine the threshold based on the transport block size scaling factor. Alternatively or additionally, the threshold may be set to a default value or to a predetermined value. The scheduling grant for the transmission will then be valid for as many TTIs as required in order for the number of modulated symbols to exceed the threshold. Hence, the threshold may be set in relation to how many information bits are coded, i.e. an effective over the air code rate. See also section "time spreading factor" below, where the use of the threshold will be further elaborated.

In some embodiments for which downlink transmission is scheduled to the user equipment 120, the radio network node 110 may inform the user equipment 120 about threshold. Thus, the radio network node 110 sends the threshold to the user equipment 120.

Action 205

In a third set of embodiments, redundancy version control is adapted to handle transmission using the transport block size scaling factor.

In these embodiments, the scheduling grant comprises a redundancy version indicator. Moreover, the radio network node 110 may map an extended redundancy version to the redundancy version indicator based on a TTI to which the scheduling grant relates. As an example, mapping may be done by use of a sequence or by calculating the current TTI modulus number of redundancy versions that can be indicated by the redundancy version indicator. See also section "redundancy version control".

Action 206

The radio network node 110 determines a scheduling grant for the transmission based on the transport block size scaling factor. The scheduling grant may be a scheduling message, including for example an uplink grant or a downlink assignment. For LTE, the scheduling message may be a downlink control information (DCI) message.

As an alternative or complement to action 202, the scheduling grant may comprise the transport block size scaling factor. Then, the user equipment 120 may be informed about the transport block size scaling factor by means of the scheduling grant as in action 207.

Action 207

After the radio network node 110 has determined the scheduling grant, the radio network node 110 sends the scheduling grant to the user equipment (120). As mentioned above, the scheduling grant may include the transport block size scaling factor. By informing the user equipment 120 about the transport block size scaling factor, the user equipment 120 is able to handle the transmissions which have been scheduled by the radio network node 110 while using the transport block size scaling factor.

Action 208

According to the first set of embodiments, in which the number of TTIs over which the transmission is spread is defined by the time spreading factor, the user equipment 120 may determine the time spreading factor based on the transport block size scaling factor. In these embodiments, the user equipment 120 is configured to determine the time spreading factor in the same manner as the radio network node 110. For example, the radio network node 110 and the user equipment 120 use the same algorithm, such as setting the time spreading factor to be equal to the transport block size scaling factor. However, other options exist as elaborated in section "time spreading factor" below.

Action 209

According to the second set of embodiments, the user equipment 120 may obtain the threshold for indicating the number of modulated symbols. The number of modulated symbols may be predefined or determined based on the transport block size scaling factor. In these embodiments, the scheduling grant for the transmission is valid for as many TTIs as required in order for the number of modulated symbols to exceed the threshold. In section "time spreading factor" below, the use of the threshold is further elaborated.

In the downlink scenario, the user equipment 120 may receive the threshold from the radio network node 110, for example via RRC signalling.

Action 210

According to the third set of embodiments, in which redundancy version control is adapted to the use of the transport block size scaling factor, the user equipment 120 may extract the extended redundancy version from the redundancy version indicator based on the TTI to which the scheduling grant relates. As is known in the art, the scheduling grant may comprise a redundancy version indicator. In section "redundancy version control" this is further elaborated.

Action 211

In the uplink scenario, the user equipment 120 may encode the transmission while using the transport block size scaling factor.

Action 212

In the downlink scenario, the radio network node 110 may encode, such as perform channel coding, the transmission while using the transport block size scaling factor.

Action 213

After action 212, the radio network node 110 may send the transmission to the user equipment 120 in the downlink scenario. In case of the uplink scenario, the radio network node 110 may receive the transmission from the user equipment 120.

Action 214

After action 213, in the uplink scenario, the radio network node 110 may decode the transmission while using the transport block size scaling factor.

In some embodiments, the decoding only is performed when the number of received modulated symbols exceeds the threshold. Thus, the radio network node 110 will not send any HARQ information, since there is no ACK or NACK to report. In this manner, automatic muting of HARQ information from the radio network node 110 may be achieved. See also section "PDCCH and HARQ-feedback".

Action 215

This action is performed only in the uplink scenario. If decoding has been performed in action 214, the radio network node 110 will have determined HARQ information which is to be reported to the user equipment 120. Hence, the radio network node 110 may send HARQ information indicative of whether the decoding was successful or a failure, such as an ACK or a NACK.

Action 216

After action 213, in the downlink scenario, the user equipment 120 may decode the transmission while using the transport block size scaling factor. In some embodiments, the decoding is only performed when the number of received modulated symbols exceeds the threshold. Thus, the user equipment 120 will not send any HARQ information, since there is no ACK or NACK to report. In this manner, automatic muting of HARQ information from the user equipment 120 may be achieved. See also section "PDCCH and HARQ-feedback".

Action 217

In the downlink scenario, the radio network node 110 may receive, from the user equipment 120, HARQ information on resources as defined by a first Control Channel Element (CCE), which first CCE corresponds to a second CCE. Generally, a CCE is a resource, such as one or more resource elements of one or more resource blocks, on a downlink control channel where a scheduling grant to the user equipment may occupy one or multiple CCEs. From one of the CCEs carrying the scheduling grant a HARQ information resource may be derived. As an example, the first CCE is used for mapping to the HARQ information resource.

In some embodiments, the second CCE is associated with the scheduling grant for the first TTI of said one or more TTIs. This means that when the user equipment 110 has received, decoded and determined the HARQ information to be reported the radio network node 110 for said one or more TTIs, the user equipment 110 will report the HARQ information on resources defined by the second CCE.

In some other embodiments, the second CCE is associated with a further scheduling grant for the last TTI of said one or more TTIs. In these embodiments, it is required that the radio network node 110 sends a scheduling grant for the last TTI.

See also section "PDCCH and HARQ-feedback" below.

Action 218

According to embodiments, in which the transmission is spread over two or more TTIs, the user equipment 120 may autonomously, i.e. without explicit uplink grant, perform uplink transmission. The user equipment 120 will may send reuse information relating to a first uplink grant for the first TTI of said one or more TTIs.

Therefore, in order to handle redundancy version control, the user equipment 120 may determine a second extended redundancy version indicator based on a further TTI to which the user equipment is scheduled to transmit. See also section "redundancy version control". The second extended redundancy version indicator will be used by the user equipment 120 when transmitting, to the radio network node 110, the further transmission in action 220.

Action 219

Similarly to action 218, but for the downlink scenario, the radio network node 110 may determine the second extended redundancy version indicator based on a further TTI for a further transmission. This is advantageous in order to the user equipment 120 to be able to autonomously receive downlink transmission. The user equipment 120 autonomously receives downlink transmission when no explicit scheduling grant has been sent by the radio base station. That is to say, the user equipment 120 receives downlink transmission without downlink assignments for each TTI of said one or more TTIs over which the transmission is spread. In these embodiments, the user equipment is configured appropriately, especially with regard to redundancy version control, in order to be able to know how to handle the further transmission as explained in action 220.

Action 220

In the downlink scenario, typically in case of autonomous transmission, the radio network node 110 may send the further transmission to the user equipment 120 according to the determined second extended redundancy version indicator. The further transmission is transmitted in a further TTI. In action 221, the user equipment 120 handles the further transmission as appropriate, i.e. the user equipment 120 may be configured to know how the extended redundancy version indicator is signalled from the radio network node 110 to the user equipment 120.

In the uplink scenario, typically in case of autonomous transmission, the user equipment 120 may send the further transmission to the radio network node 110 in the further TTI according to the second extended redundancy version indicator as determined in action 218.

Action 221

After action 220, in the downlink scenario, the user equipment 120 may determine the second extended redundancy version indicator based on the further TTI.

Action 222

After action 220, in the uplink scenario, the radio network node 110 may determine the second extended redundancy version indicator based on the further TTI. It shall be understood that the radio network node 110 is aware of the second extended redundancy version since the radio network node 110 handles scheduling of the user equipment 120. In practice, the radio network node 110 may store the redundancy version with which it scheduled the user equipment 120 for a certain TTI.

The Time Spreading Factor

Now referring back to for example action 203 and 208, the time spreading factor will be further explained.

The time spreading factor, $T_{spread}(i)$, where i is an integer ≥1, can be defined and signaled. $T_{spread}(i)$ can be predefined in a Table; it can be signaling or broadcast from the radio network node 110 to the user equipment 120, or other user equipments associated with the radio network node 110. It may also be assigned or pre-defined per UE class. A UE class may be a UE category as in a 3GPP standard specification, such as TS 36.306. The $T_{spread}(i)$ may be equal to a value multiplied by the transport block size scaling factor (TBS scaling factor). The value may be equal to one. In other examples, the value may be equal to less than or greater than one. When the value is greater than one, it is assured that a plurality of TTIs are used for the transmission.

In the uplink scenario, the time spreading factor may determine a number of TTIs over which the user equipment 120 shall spread the transmission. The user equipment 120 may do this autonomously without explicit uplink grants. In other scenarios, explicit uplink grants may be sent to the user equipment 120 for each TTI over which the transmission is to be spread.

For user equipments and/or UE classes that support the feature described herein the signaling can be one or more bits indicating a number i. The number i can either semi statically or dynamically be assigned to the UE for the corresponding transmissions the number of TTIs $T_{spread}(i)$ for which the UE should spread the transmission over. The signaling could, for example, be included in RRC signaling for the semi-statically configured case or it could be included in the scheduling grant for the corresponding transmission in the dynamical case.

As described for some embodiments, the scheduling grant may be valid for the signaled $T_{spread}(i)$ TTIs, without sending scheduling grants. In other embodiments, the scheduling grant may be valid until the threshold, see for example action 204 and 209, is reached. The threshold may be configured or fixed, i.e. predefined. As mentioned above, the threshold indicates the number of modulated symbols. The number of modulated symbols may be represented by an effective code rate. Hence, one such threshold could be on the effective code-rate. If for example a code-rate threshold is configured to 0.9 and the effective code-rate of the transmission given by the scheduling grant is 2, i.e. the transport block size is twice as large as the number of transmitted bits in one TTI, the scheduling grant would be valid for three TTIs, as after three TTIs the code rate becomes 2/3<0.9. After only 2 TTIs, the code rate is still too large, i.e. 2/2>0.9.

Coding of Transmissions Time-Spread by Means of the Time-Spreading Factor

A coding implementation would also need to be defined, either statically in a standard, such as one defined by Third Generation Partnership Project (3GPP), or configurable for the network. How the coding should be performed can be described in a number of ways. This is one example and other embodiments may be implemented in other ways.

When it comes to coding there are potentially two parameters that may be signalled.

Firstly, there is the transport block size scaling factor for scaling of the transport block size, this factor is denoted $F_{scal}$ (real/rational number >0). In this manner, the transport block size is scaled as given by the transport block size scaling factor. It may also be other parameters, such as resource blocks (RBs), that are scaled with $F_{scal}$. This factor may, for example, be included in the PDCCH-transmission or be semi-statically configured using RRC-signalling as described above with reference to for example action 202 and 207. Then one or more bits, or code points, would be used to signal $F_{scal}$ from some predefined or signaled set of possible values. Hence this factor is used to scale the channel coding for a given HARQ-process or all HARQ-process occurring after the RRC reconfiguration.

Secondly, there is the time spreading factor, $T_{spread}(i)$ which may be implemented in some scenarios such as when explicit signaling on the PDCCH is not desired. For example, the two following scenarios may be contemplated:

1. A single PDCCH assignment/grant should be valid for a number of TTIs when $T_{spread}(i)>1$ instead of signaling each TTI (scenario 1). See for example Action 218 to 220.
2. A single PDCCH assignment/grant should be used for a number of active HARQ-processes instead of using a PDCCH assignment/grant for every parallel data transmission (scenario 2).

In scenario 2, a multiplexing factor $F_{mult}$ (integer could be used to indicate the number of transport blocks from different HARQ-process that can/should be transmitted in parallel. Hence for $F_{mult}>1$ this factor will enable the flexibility to do parallel retransmissions and new data transmissions (using multiple HARQ-processes), see FIG. 3 for an example of such a scenario, without using extra PDCCH resources. How to resolve which resource blocks contain different transmissions could, for example, be resolved using time ordering, i.e. the oldest HARQ-process would be assigned resource blocks according to a predefined ordering of the resource blocks assigned in the PDCCH assignment/grant. The transport block size indicated by the PDCCH-transmission would then only be applicable for the new data. This scenario could also be signalled by including additional HARQ-process fields in the PDCCH-format indicating which HARQ-process should be multiplexed.

Figure 4:
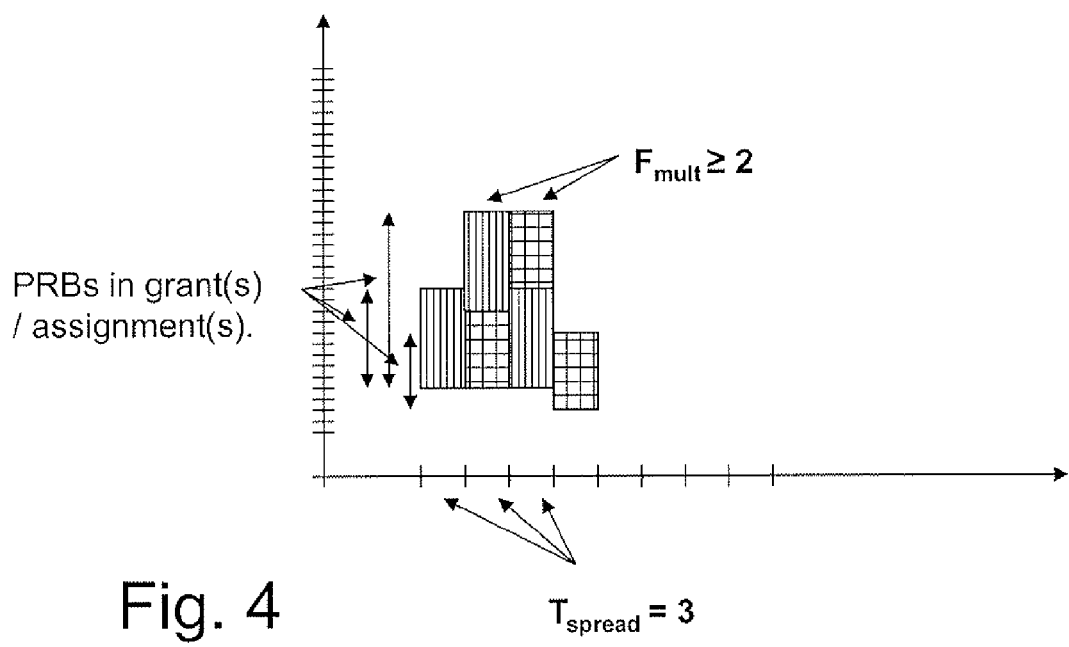
FIG. 4 is a schematic overview of two circular buffers.

In FIG. 4, vertically striped blocks indicate physical resource blocks (PRBs) for which a first sequence of transmissions belonging to one HARQ-process has been scheduled (for the same turbo-coded transport-block). Checkered blocks indicate PRBs for which a second sequence of transmissions belonging to another HARQ-process has been scheduled.

HARQ-feedback per parallel data transmission would then be enabled. The feedback could then be handled in the standard way using either full (one bit per HARQ-process) or partial HARQ-feedback, more about HARQ-feedback. You can also enable frequency hopping and/or frequency interleaving for the parallel data streams within the resource block allocation for the user by predefining how this should be done, for example, pseudo-randomly per cell.

The transport block size scaling factor $F_{scal}$ describe how to scale the transport block size, hence one way to pick $F_{scal}$ in-order to maintain peak-bit rate is to scale the transport block size with the number of TTIs used for transmission ($T_{spread}(i)$). Another possibility is to use the factor $F_{scal}$ for better coverage/lower error rate and hence simply spread the coding for a given modulation using the circular buffer by setting for example ($1/T_{spread}(i)$). The factor $F_{scal}$ could of course also be used when $T_{spread}(i)=1$ in order to get more diversity in frequency by spreading a transmission in frequency. As an example consider the case that an eNodeB schedules 10 resource blocks (RBs) to a user with $F_{scal}=2$, the user will then choose transport block size (TBS) according to the value for 20 RBs, similarly if $F_{scal}=\frac{1}{2}$ the user will choose TBS according to the value for 5 RBs. The signaling for $F_{scal}$ could indicate which value from some pre-defined list should be used, as an example two bits may be used to indicate that $F_{scal}$ is from the following list $\{\frac{1}{2}, 1, 2, 4\}$, that is $F_{scal}(0)=\frac{1}{2}$, $F_{scal}(1)=1$; $F_{scal}(2)=2$ and $F_{scal}(3)=4$.

This would further be improved by extending the number of RBs listed in the MCS look-up tables so that TBS is listed up to some other larger value according to the highest RB allocation that may be desired to support and the largest supported value for $F_{scal}$ (i), for example, if $F_{scal}$ (i)=4 is supported, then it would be natural to list up to 440 RBs in the MCS look-up Table 7.1.7.2.1-1 in 3GPP 36213 instead of 110 RBs as is listed at present. Alternative to extending the table would be to have a mapping function for RBs larger than 110. An example of such a function would be to just scale the TBS indicated in the grant with the spreading factor, $T_{spread}(i)*$ TBS(RBs).

One example embodiment may be to semi-statically assign a TBS scaling factor ($F_{scal}$) and a time spreading factor ($T_{spread}$) to the HARQ-process. Hence, in the grant/assignment the indicator for which HARQ-process should be used will implicitly also signal what values should be used for $F_{scal}$ and $T_{spread}$.

PDCCH and HARQ-Feedback

Here different embodiments for the implementation when $T_{spread}(i)>1$ are described.

The simplest is to explicitly signal, in each TTI to the UE, the resource allocation and link adaptation. In each TTI, the eNodeB will also implicitly schedule HARQ-feedback resource assignment (from CCE-indices or first RBs) on PUCCH or PHICH.

One improvement to embodiments using the threshold, mentioned in action 204, is to have automatic mute on HARQ feedback transmissions by defining a code-rate threshold $T_{cr}$ that is either signaled or predefined. Please refer to for example action 214 and 216 above. This threshold then defines that while the accumulated code-rate for sent/received transmissions is higher than $T_{cr}$, then the UE should not listen/send any HARQ-feedback. Another example is when $T_{cr}=1$, in this case the transmission cannot be decoded until at least all bits in the message have been received. Hence, the HARQ-feedback will always be a NACK if not all bits have been received. An alternative to having a code-rate threshold is to have a symbol information threshold, counting the number of demodulated symbols instead of bits to allow for more freely changing modulation order.

Another embodiment is to only send a first assignment/grant and then let the resource allocation be fixed for the duration of TTIs defined from $T_{spread}(i)$. This is not problematic for PUSCH HARQ-feedback but for PDSCH the associated PUCCH resource would need to be mapped in some way, for example by keeping the corresponding CCE unused for the TTI corresponding to the HARQ-feedback scheduling period, or have a mandatory explicit assignment for the last PDSCH transmission. Another alternative is to us a semi-statically preconfigured resource for HARQ feedback on PUCCH.

Redundancy Version Control

Figure 3:
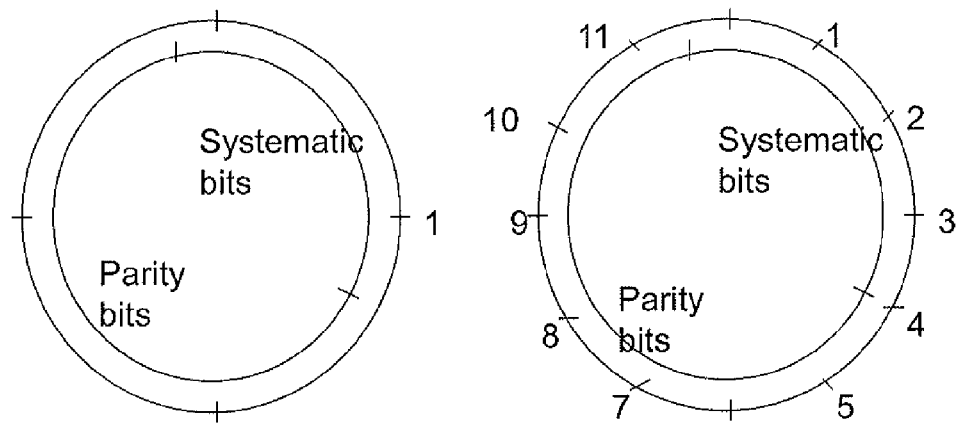
FIG. 3 is an exemplifying block diagram illustrating time-spread transmissions.

In order to enable soft-buffer combining to take advantage of the embodiments above, the decoding entity, i.e. the user equipment in case of downlink and the radio base station in case of uplink, needs to know where in the circular buffer the received bits should be mapped. Using TBS scaling with $F_{scal}>1$ it would be beneficial to be able to signal redundancy version, which indicates where in the circular buffer the bits should be mapped, with higher resolution than what is currently supported, as illustrated in FIG. 3. As exemplified, in for example action 205, 210 220 and 222, the extended redundancy version may be used. For example, consider the case that in a first TTI of a multiple number of TTIs that are transmitted, the code rate is larger than 1, hence not even enough bits have been transmitted in order to be able to decode the transmission. The code rate is the ratio of information bits and transmitted bits. For example, if 1024 bits are transmitted, which bits originally was 512 information bits before turbo coding, the code-rate is 1/2. In FIG. 3, systematic bits refer to data bits and parity bits refer to error-correction bits.

A time coded redundancy version, as an example of the extended redundancy version, with higher resolution signaling may be achieved the redundancy version $r_j$ is signaled by taking the index j modulus the factor 4 and split the circular buffer into $T_{spread}(i)*4$ pieces. The factor 4 is here used as an example and is equal to the number of possible redundancy versions currently possible to signal in the LTE standard, some other integer number would also be possible. As an example, consider that $T_{spread}(i)=3$ and $r_j=j$, then for the received signaled sequence 0, 1, 2, 3, 0, 2 . . . the decoding entity will map this as redundancy versions 0, 1, 2, 3, 4, 6 . . . . This coding thus uses the time resolution when the PDCCH signaling was sent/received as a type of time spreading code. Further it uses that both UE and eNodeB is in agreement that redundancy version numbers should come in some sequence as a means of error-correction (not necessarily 0, 1, 2, . . . as in the first example). Hence the redundancy number will only be misinterpreted if 4 or more consecutive PDCCH transmissions are missed. Observe that any sequence could be pre-agreed between the transmitter and receiver, either by signaling which sequence should be used or listing the sequence to use depending on choice of MCS, $T_{spread}(i)$, $F_{scal}(i)$, and any other relevant parameter, such as code-rate, transport-block-size, resource allocation (nr of resource blocks (in frequency and time), modulation, power). Example, if the agreed sequence $r_j$ is {7, 2, 11, 0, 1, 3, 4, 10, 9, 6, 5, 8} and as above the receive signaled sequence is 0, 1, 2, 3, 0, 2 . . . then the mapped redundancy versions is then 7, 2, 11, 0, 1, 4. How to determine which sequence that is more beneficial depending on scenario is outside of the scope of this disclosure.

In some embodiments, additional bits in the retransmission grant may used to indicate the extended redundancy version. According to some embodiments, the bit(s) used to signal $F_{scal}$ is used to code the redundancy version used in grant/assignments signaled using the retransmission formats in the MCS table, such as MCS 29-31 which is known from Third Generation Partnership project (3GPP).

Figure 5:
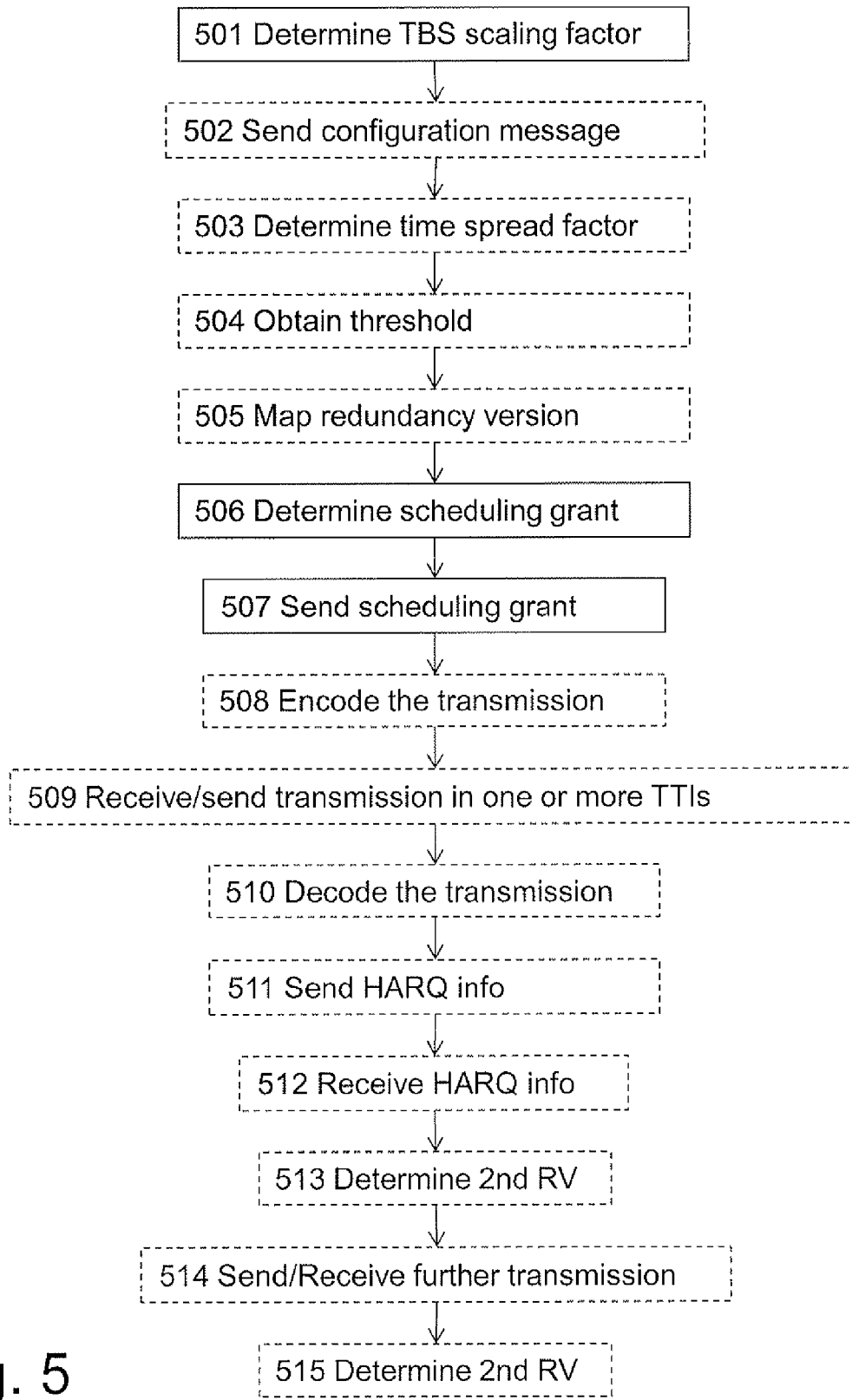
FIG. 5 is a schematic flowchart, illustrating the methods of FIGS. 2 and 9 when seen from the radio network node.

In FIG. 5, a schematic flow chart of the exemplifying method of FIG. 2 when seen from the radio network node 110 is shown. As mentioned above, the radio network node 110 performs a method for transmission between the radio network node 110 and a user equipment 120.

The following actions may be performed in any suitable order.

Action 501

The radio network node 110 determines the transport block size scaling factor.
The transport block size scaling factor may be determined based on one or more of:
  amount of data to be scheduled,
  variation of channel quality of one or more upcoming transmission timing intervals onto which the transmission is to be scheduled, and
  delay sensitivity of data to be scheduled.
This action is similar to action 201.

Action 502

As mentioned, the radio network node 110 may send the configuration message to the user equipment 120, wherein the configuration message may comprise the transport block size scaling factor. This action is similar to action 202.

Action 503

The radio network node 110 may determine the time spreading factor based on the transport block size scaling factor, wherein the time spreading factor may indicate the number of consecutive transmission time intervals over which the transmission is to be transmitted. This action is similar to action 203.

Action 504

As mentioned, the radio network node 110 may obtain the threshold for indicating the number of modulated symbols, wherein the scheduling grant for the transmission may be valid for as many transmission timing intervals as required in order for the number of modulated symbols to exceed the threshold. This action is similar to action 204.

Action 505

As mentioned, the scheduling grant may comprise a redundancy version indicator. Then, the radio network node 110 may map an extended redundancy version to the redundancy version indicator based on a transmission timing interval to which the scheduling grant relates. This action is similar to action 205.

Action 506

The radio network node 110 determines the scheduling grant for the transmission based on the transport block size scaling factor. This action is similar to action 206.

Action 507

The radio network node 110 sends the transport block size scaling factor and the scheduling grant to the user equipment 120. In this manner, the scheduling grant schedules the transmission.

As mentioned, the scheduling grant may comprise the transport block size scaling factor. Hence, the radio network node 110 sends the TBS scaling factor in conjunction with RRC configuration information as in action 502 or a scheduling grant/assignment to the user equipment.

This action is similar to action 207.

Action 508

For the downlink scenario, the radio network node 110 may encode the transmission while using the transport block size scaling factor. This action is similar to action 212.

Action 509

For the downlink scenario, the radio network node 110 may send the transmission to the user equipment 120.
For the uplink scenario, the radio network node 110 may receive the transmission.
This action is similar to action 213.

Action 510

For the uplink scenario, the radio network node 110 may decode the transmission while using the transport block size scaling factor. The decoding may be performed when the number of received modulated symbols exceeds the threshold.

This action is similar to action 214.

Action 511

For the uplink scenario, the radio network node 110 may send HARQ information indicative of whether the decoding was successful or a failure. This action is similar to action 215.

Action 512

The radio network node 110 may receive, from the user equipment 120, HARQ information on resources as defined by the first Control Channel Element, which first Control Channel Element may correspond to the second Control Channel Element.

In some embodiments, the second Control Channel Element is associated with the scheduling grant for the first transmission timing interval of said one or more transmission timing intervals. Alternatively or additionally, the second Control Channel Element is associated with the further scheduling grant for the last transmission timing interval of said one or more transmission timing intervals.

This action is similar to action 217.

Action 513

For the downlink scenario, the radio network node 110 may determine the second extended redundancy version indicator based on the further transmission timing interval for the further transmission. This action is similar to action 219.

Action 514

For the uplink scenario, the radio network node 110 may receive the further transmission in the further transmission timing interval.

For the downlink scenario, the radio network node 110 may send the further transmission according to the determined second extended redundancy version indicator.

This action is similar to action 220.

Action 515

For the uplink scenario, the radio network node 110 may determine the second extended redundancy version indicator based on the further transmission timing interval. This action is similar to action 222.

Figure 6:
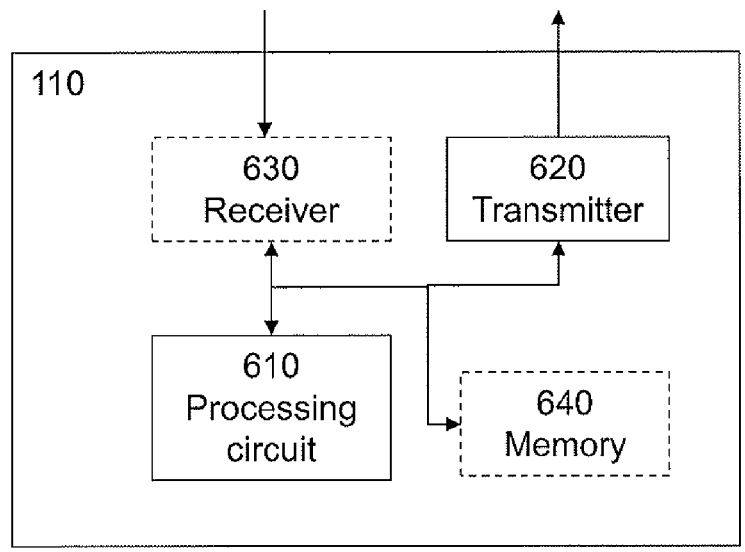
FIG. 6 is a schematic block diagram, illustrating an exemplifying radio network node configured to perform the methods illustrated in FIGS. 2, 5 and 9.

In FIG. 6, a schematic block diagram of an exemplifying radio network node 110 is shown. The radio network node 110 may be configured to perform one or more of the methods in the radio network node 110 described above. That is to say, the radio network node may be configured to perform a method for scheduling transmission between the radio network node 110 and the user equipment 120.

The radio network node 110 comprises a processing circuit 610.

The processing circuit 610 may be configured for enabling the radio base station to perform one or more of the methods above.

In particular, the processing circuit 610 is configured to:
determine a transport block size scaling factor,
determine a scheduling grant for the transmission based on the transport block size scaling factor, and
send the transport block size scaling factor and the scheduling grant to the user equipment 120. In this manner, the scheduling grant schedules the transmission. The scheduling grant may comprise the transport block size scaling factor.

The processing circuit 610 may be configured to determine the transport block size scaling factor based on one or more of:
amount of data to be scheduled,
variation of channel quality of one or more upcoming transmission timing
intervals onto which the transmission is to be scheduled, and
delay sensitivity of data to be scheduled.

The processing circuit 610 may be configured to encode the transmission while using the transport block size scaling factor.

The processing circuit 610 may be configured to decode the transmission while using the transport block size scaling factor. The processing circuit 610 may be configured to perform the decoding when the number of received modulated symbols exceeds the threshold.

In some embodiments, the scheduling grant comprises a redundancy version indicator. Then, the processing circuit 610 may be configured to map an extended redundancy version to the redundancy version indicator based on a transmission timing interval to which the scheduling grant relates.

The processing circuit 610 may be configured to determine a time spreading factor based on the transport block size scaling factor, wherein the time spreading factor indicates a number of consecutive transmission time intervals over which the transmission is to be transmitted.

The processing circuit 610 may be configured to obtain a threshold for indicating a number of modulated symbols, wherein the scheduling grant for the transmission is valid for as many transmission timing intervals as required in order for the number of modulated symbols to exceed the threshold.

The processing circuit 610 may be configured to determine a second extended redundancy version indicator based on the further transmission timing interval.

The processing circuit 610 may be configured to determine a second extended redundancy version indicator based on a further transmission timing interval for a further transmission.

The processing circuit 610 may be a processing unit, a processor, an application specific integrated circuit (ASIC), a field-programmable gate array (FPGA) or the like. As an example, a processor, an ASIC, an FPGA or the like may comprise one or more processor kernels.

The radio network node 110 further comprises a transmitter 620.

The transmitter 620 may be configured to send a configuration message to the user equipment 120, wherein the configuration message may comprise the transport block size scaling factor.

The transmitter 620 may be configured to send the transmission to the user equipment 120.

The transmitter 620 may be configured to send HARQ information indicative of whether the decoding was successful or a failure.

The transmitter 620 may be configured to send the further transmission according to the determined second extended redundancy version indicator.

The radio network node 110 may further comprise a receiver 630.

The receiver 630 may be configured to receive the transmission.

The receiver 630 may be configured to receive, from the user equipment (120), HARQ information on resources as defined by a first Control Channel Element, which first Control Channel Element corresponds to a second Control Channel Element.

The second Control Channel Element may be associated with the scheduling grant for the first transmission timing interval of said one or more transmission timing intervals. Alternatively, the second Control Channel Element may be associated with a further scheduling grant for the last transmission timing interval of said one or more transmission timing intervals.

The receiver 630 may be configured to receive a further transmission in a further transmission timing interval.

In some embodiments of the radio network node (also referred to as the radio base station), the radio network node 110 may further comprise a memory 640 for storing software to be executed by, for example, the processing circuit. The software may comprise instructions to enable the processing circuit to perform the method in the radio network node 110 as described above in conjunction with FIGS. 2 and/or 5. The memory 640 may be a hard disk, a magnetic storage medium, a portable computer diskette or disc, flash memory, random access memory (RAM) or the like. Furthermore, the memory may be an internal register memory of a processor.

Figure 7:
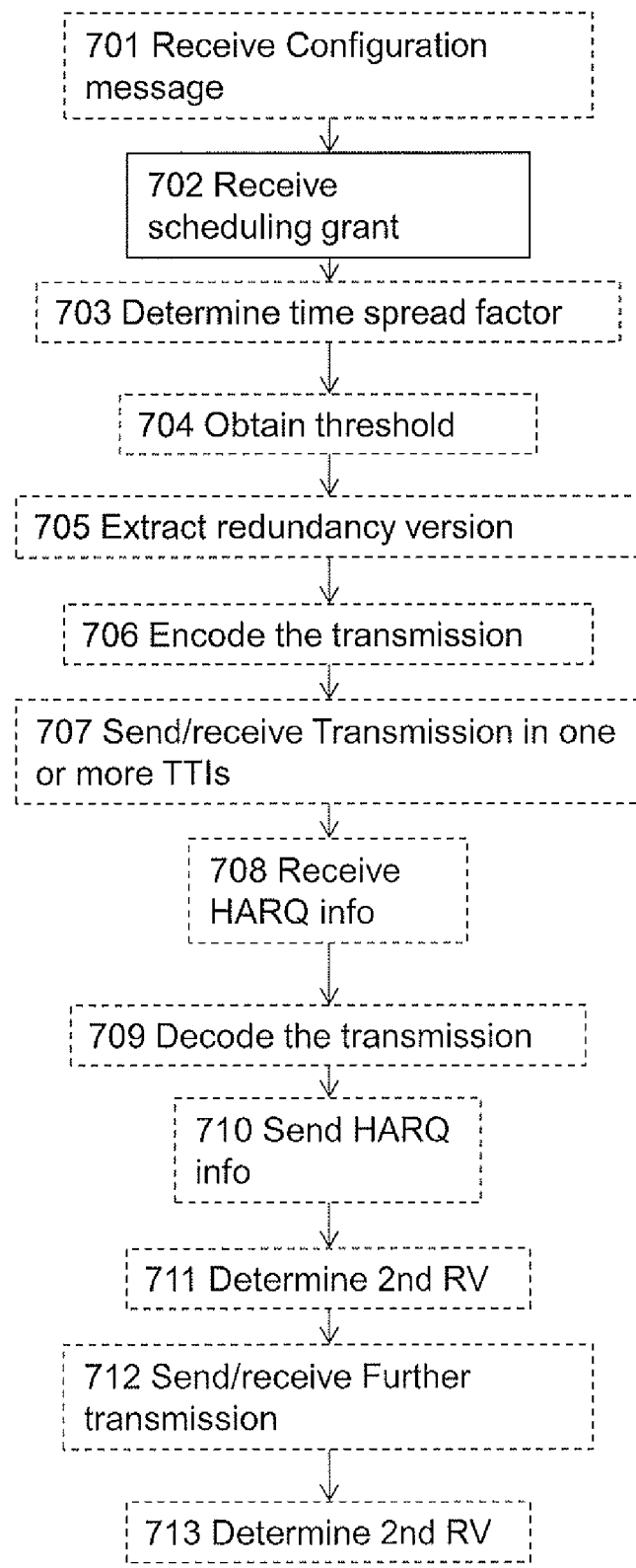
FIG. 7 is a schematic flowchart, illustrating the methods of FIGS. 2 and 9 when seen from the user equipment.

In FIG. 7, a schematic flow chart of the exemplifying method of FIG. 2 when seen from the user equipment 120 is shown. The user equipment 120 performs a method for receiving a scheduling grant for a transmission between the user equipment 120 and a radio network node 110.

The following actions may be performed in any suitable order.

Action 701

As mentioned, the user equipment 120 may receive the configuration message from the radio network node 110. The configuration message may comprise the transport block size scaling factor. This action is similar to action 202.

Action 702

The user equipment 120 receives the transport block size scaling factor and the scheduling grant from the radio network node 110. The transport block size scaling factor may be comprised in the scheduling grant. This action is similar to action 207.

Action 703

The user equipment 120 may determine the time spreading factor based on the transport block size scaling factor, wherein the time spreading factor may indicate the number of consecutive transmission time intervals over which the transmission is transmitted. This action is similar to action 208.

Action 704

The user equipment 120 may obtain the threshold for indicating the number of modulated symbols, wherein the scheduling grant for the transmission may be valid for as many transmission timing intervals as required in order for the number of modulated symbols to exceed the threshold. This action is similar to action 209.

Action 705

In some embodiments, the scheduling grant comprises the redundancy version indicator. Then, the user equipment 120 may extract the extended redundancy version from the redundancy version indicator based on a transmission timing interval to which the scheduling grant relates. This action is similar to action 210.

Action 706

The user equipment 120 may encode the transmission while using the transport block size scaling factor. This action is similar to action 211.

Action 707

The user equipment 120 may receive the transmission in the downlink scenario. Moreover, the user equipment 120 may send the transmission in the uplink scenario. This action is similar to action 213.

Action 708

The user equipment 120 may receive HARQ information. This action is similar to action 215.

Action 709

The user equipment 120 may decode the transmission while using the transport block size scaling factor. The decoding may be performed when the number of received modulated symbols exceeds the threshold. This action is similar to action 216.

Action 710

The user equipment 120 may send HARQ information indicative of whether the decoding was successful or a failure. The HARQ information may be sent on resources as defined by the first Control Channel Element "CCE", which first CCE corresponds to the second CCE.

The second CCE may be associated with the scheduling grant for the first transmission timing interval of said one or more transmission timing intervals.

Alternatively or additionally, the second CCE may be associated with the further scheduling grant for the last transmission timing interval of said one or more transmission timing intervals.

This action is similar to action 217.

Action 711

The user equipment 120 may determine the second extended redundancy version indicator based on the further transmission timing interval. This action is similar to action 218.

Action 712

For the uplink scenario, the user equipment 120 may send the further transmission in the further transmission timing interval according to the second extended redundancy version indicator.

For the downlink scenario, the user equipment 120 may receive the further transmission according to the second extended redundancy version indicator in the further transmission timing interval.

This action is similar to action 220.

Action 713

The user equipment 120 may determine the second extended redundancy version indicator based on the further transmission timing interval. This action is similar to action 221.

Summarizing information that may be received by the user equipment 120 according the actions above, it can be said that the user equipment 120 may receive, from the radio network node 110, information about one or more of:
- the transport block size scaling factor,
- the time spreading factor,
- the redundancy version, which may be dependent on the TBS scaling factor, and
- the order at which the user equipment received the redundancy version numbers to determine interpretation of redundancy version number.

The information may be received through RRC configuration.

The TBS scaling factor and/or the time spreading factor may be received in conjunction with scheduling assignments/grants, such as uplink grant and downlink assignments.

Figure 8:
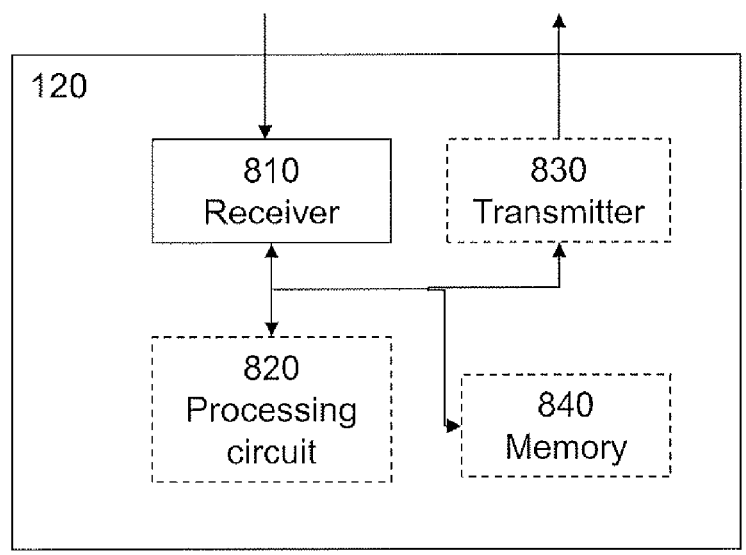
FIG. 8 is a schematic block diagram, illustrating an exemplifying user equipment configured to perform the methods illustrated in FIGS. 2, 7 and 9.

In FIG. 8, a schematic block diagram of an exemplifying user equipment 120 is shown. The user equipment 120 may be configured to perform one or more of the methods in the user equipment described above. That is to say the user equipment 120 is configured to receive a scheduling grant for a transmission between the user equipment 120 and a radio network node 110.

The user equipment 120 comprises a receiver 810 configured to receive a transport block size scaling factor and a scheduling grant from the radio network node 110.

As mentioned, the transport block size scaling factor may be comprised in the scheduling grant. Alternatively or additionally, the receiver 810 may receive a configuration message from the radio network node 110, wherein the configuration message may comprise the transport block size scaling factor.

The receiver 810 may be configured to receive the transmission.

The receiver 810 may be configured to receive a further transmission according to a second extended redundancy version indicator in a further transmission timing interval.

The user equipment 120 may comprise a processing circuit 820. The processing circuit 820 may be configured to enable the user equipment to perform one or more of the methods above.

The processing circuit 820 may be configured to decode the transmission while using the transport block size scaling factor.

The processing circuit 820 may be configured to encode the transmission while using the transport block size scaling factor.

The processing circuit 820 may be configured to determine a time spreading factor based on the transport block size scaling factor, wherein the time spreading factor may indicate a number of consecutive transmission time intervals over which the transmission is transmitted.

The processing circuit 820 may be configured to obtain a threshold for indicating a number of modulated symbols, wherein the scheduling grant for the transmission may be valid for as many transmission timing intervals as required in order for the number of modulated symbols to exceed the threshold.

The processing circuit 820 may be configured to decode when the number of received modulated symbols exceeds the threshold.

In some embodiments, the scheduling grant may comprise a redundancy version indicator. Then, the processing circuit 820 may be configured to extract an extended redundancy version from the redundancy version indicator based on a transmission timing interval to which the scheduling grant relates.

The processing circuit 820 may be configured to determine a second extended redundancy version indicator based on a further transmission timing interval.

The processing circuit 820 may be configured to determine the second extended redundancy version indicator based on the further transmission timing interval.

The processing circuit 820 may be a processing unit, a processor, an application specific integrated circuit (ASIC), a field-programmable gate array (FPGA) or the like. As an example, a processor, an ASIC, an FPGA or the like may comprise one or more processor kernels.

The user equipment 120 may comprise a transmitter 830.

The transmitter 830 may be configured to send the transmission.

The transmitter 830 may be configured to send HARQ information indicative of whether the decoding was successful or a failure.

The HARQ information may be sent on resources as defined by a first Control Channel Element "CCE", which first CCE corresponds to a second CCE.

The second CCE may be associated with the scheduling grant for the first transmission timing interval of said one or more transmission timing intervals.

The second CCE may be associated with a further scheduling grant for the last transmission timing interval of said one or more transmission timing intervals.

The transmitter 830 may be configured to send a further transmission in the further transmission timing interval according to the second extended redundancy version indicator.

In some embodiments, the user equipment 120 may further comprise a memory 840 for storing software to be executed by, for example, the processing circuit. The software may comprise instructions to enable the processing circuit to perform the method in the user equipment as described above in conjunction with FIGS. 2 and/or 7. The memory 840 may be a hard disk, a magnetic storage medium, a portable computer diskette or disc, flash memory, random access memory (RAM) or the like. Furthermore, the memory may be an internal register memory of a processor.

According to embodiments herein, turbo-coding is performed while using a TBS scaling factor for a given the MCS choice for the transmission. This enables that a number of consecutive TTI:s can be used to spread the data. Hence, it may be possible to a higher modulation and code-rate for a given BLER-target than what is possible to use if you want each transmission in each TTI to have same BLER. A higher modulation implies less robust transmission but improved bit rate. This is achieved while still maintaining low latency for small packets using dynamic signalling.

EXAMPLE

If you have a single strong interferer that drop SINR 20 dB that transmits with a probability of 15% and a 10% BLER target is used, in principle a MCS in line with a SINR that is 20 dB lower than the typical SINR must be used.

According to some embodiments, it is described how to use transport block scaling and/or use multiple transport blocks in order to maintain maximum throughput and/or handle multiplexing retransmissions with new data in number of consecutive TTIs. Therefore, a concept for coding the redundancy version for the circular buffer is introduced. The coding uses a type of time-spreading error correcting code that takes advantage of a fact that there is a very low probability of missing consecutive Physical Downlink Control Channel (PDCCH) scheduling grants.

Furthermore, alternative HARQ-schemes are disclosed. The HARQ-schemes may be particularly beneficial with the embodiments herein. These HARQ-schemes may also be useful in other scenarios which do not involve the TBS scaling factor.

Figure 9:
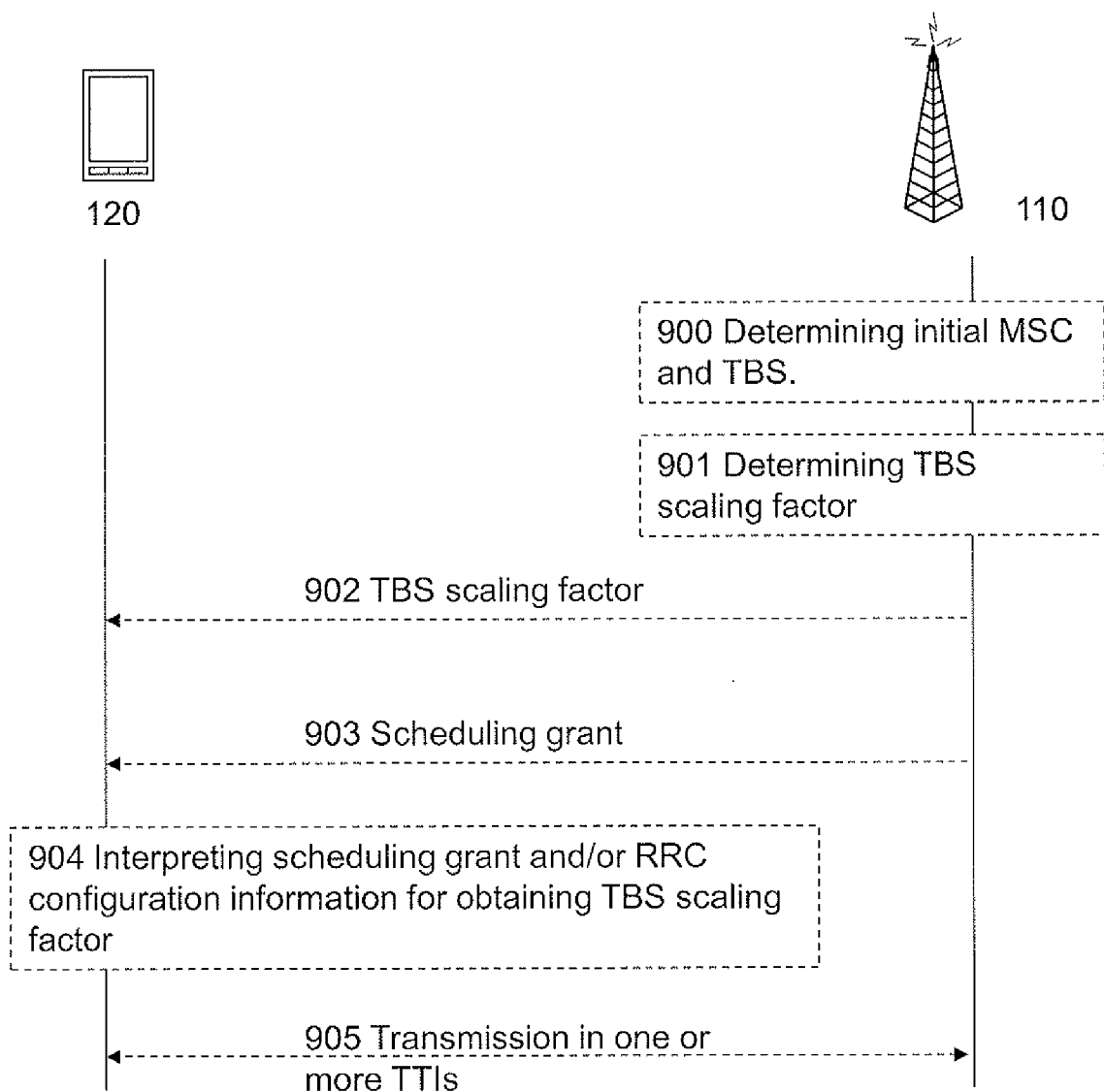
FIG. 9 is a schematic, combined signalling scheme and flowchart of the exemplifying methods performed in the radio communication system according to FIG. 1.

With reference to FIG. 9, embodiments disclosed herein are described when implemented in the radio communication system of FIG. 1. In this example, the radio network node 110 is an eNB.

The following actions may be performed in any suitable order.

Action 900

In view of an upcoming TTI, the eNB 110 may determine an initial modulation and coding scheme and an initial transport block size for the transmission as is known in the art. In this manner, a first amount of data may be transmitted in the upcoming TTI. This action may be omitted.

Action 901

The eNB 110 determines a transport block size (TBS) scaling factor. The determined TBS scaling factor may be based on one or more of:

amount of data to be scheduled, i.e. the amount of data in a data buffer for scheduling. The data buffer may be a send buffer of the eNB 110 or a send buffer of the user equipment 120, variation of channel quality of one or more upcoming transmission timing intervals (TTIs), wherein channel quality may take interference into account, and delay sensitivity of data to be scheduled, wherein the delay sensitivity may relate to Quality of Service (QoS).

In this manner, a revised transport block size may be determined by multiplying the initial transport block size by the TBS scaling factor. The revised transport block size implies that further data as compared to the initial transport block size may be transmitted by the eNB 110 in case of downlink or by the user equipment 120 in case uplink.

Given the revised transport block size, the transmission, i.e. the data thereof, may be spread over two or more consecutive TTIs when the TBS scaling factor is greater than one. Given the channel quality for these TTIs a revised modulation and coding scheme is determined by the eNB 110 while taking a given BLER-target into account.

As a result of the TBS scaling factor, time diversity for the transmission is increased. Therefore, modulation and coding scheme for the transmission may be adapted to an average channel quality for those TTIs over which the transmission is spread. The TTIs over which the transmission is spread may be determined by the TBS scaling factor. In other examples, a time spreading factor, $T_{spread}$, is used as is described below.

Action 902

The eNB 110 sends information about the TBS scaling factor to the user equipment 120 and the user equipment 120 receives information about the TBS scaling factor.

In some examples, the information about the TBS scaling factor may be included in the scheduling grant as described in action 204 below. Alternatively or additionally, the information about the TBS scaling factor may be sent to the user equipment 120 via Radio Resource Control (RRC) signalling.

By means of the TBS scaling factor, the user equipment 120 is able to interpret how to send/receive the transmission. Two examples for when the TBS scaling factor is greater than one. For example, the user equipment 120 may need to receive two or more TTI before performing channel decoding in case of downlink. As another example, in case of uplink, the user equipment 120 may allow a transport block to be transmitted over two or more TTIs.

Action 903

The eNB 110 sends a scheduling grant to the user equipment 120 and the user equipment 120 receives the scheduling grant from the eNB 110. The scheduling grant may be an uplink grant or a downlink assignment.

Action 904

The user equipment 120 may decodes the scheduling grant, whereby the TBS scaling factor is obtained for the upcoming TTI or TTIs.

Action 905

The transmission is transferred, in one or more TTIs, between the eNB 110 and the user equipment 120 according to the RRC configuration and the scheduling grant.

Figure 10:
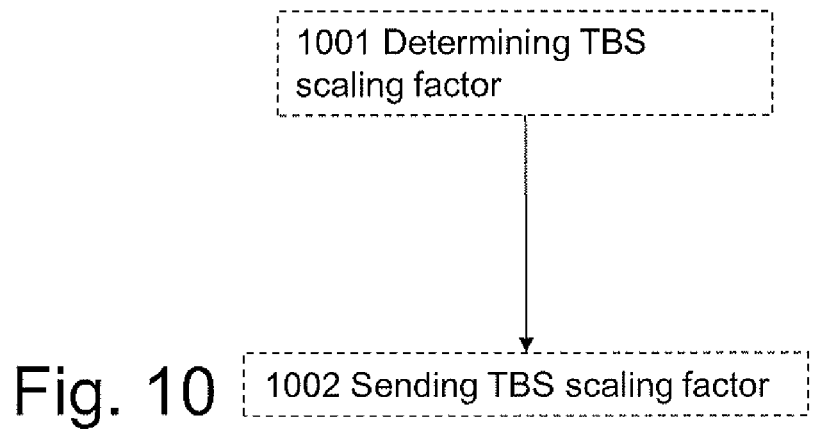
FIG. 10 is a schematic flowchart, illustrating the method of FIG. 9 when seen from the radio network node.

In FIG. 10, a schematic flow chart of the exemplifying method of FIGS. 2 and/or 9 when seen from the radio network node 110 is shown.

Action 1001

The radio network node 110 determines as in action 201 a TBS scaling factor.

Action 1002

The radio network node 110 sends the TBS scaling factor in conjunction with RRC configuration information or a scheduling grant/assignment to the user equipment.

Figure 11:
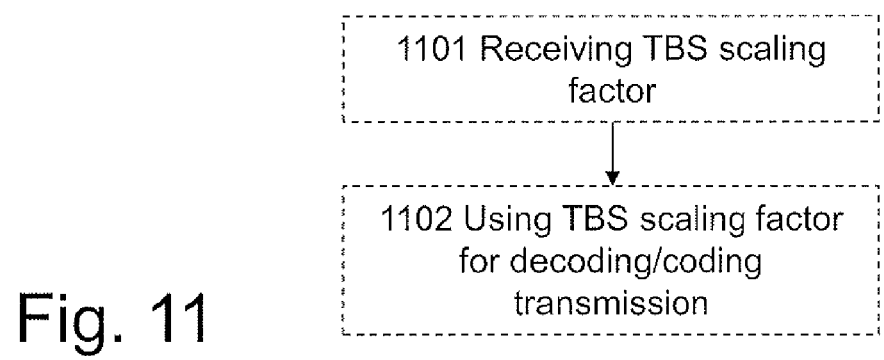
FIG. 11 is a schematic flowchart, illustrating the method of FIG. 9 when seen from the user equipment.

In FIG. 11, a schematic flow chart of the exemplifying method of FIGS. 2 and/or 9 when seen from the user equipment 120 is shown.

Action 1101

The user equipment 120 receives, from the radio base station 110, information about one or more of:
the TBS scaling factor,
the time spreading factor,
the redundancy version, which may be dependent on the TBS scaling factor, and
the order at which the user equipment received the redundancy version numbers to determine interpretation of redundancy version number.

The information may be received through RRC configuration.

The TBS scaling factor and/or the time spreading factor may be received in conjunction with scheduling assignments/grants, such as uplink grant and downlink assignments.

Action 1102

The user equipment 120 uses the transport block size scaling factor, TBSS factor, for encoding and/or decoding of the transmission.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a radio network node for scheduling a transmission between the radio network node and a user equipment, the method comprising:
   determining a transport block size scaling factor;
   determining a time spreading factor based on the transport block size scaling factor, wherein the time spreading factor indicates a number of consecutive transmission time intervals over which the transmission is to be transmitted;
   determining a scheduling grant for the transmission, based on the transport block size scaling factor and the time spreading factor; and
   sending the transport block size scaling factor and the scheduling grant to the user equipment, whereby the scheduling grant schedules the transmission.

2. The method of claim 1, wherein determining the transport block size scaling factor is based on one or more of:
   an amount of data to be scheduled,
   a variation of channel quality of one or more upcoming transmission timing intervals onto which the transmission is to be scheduled, and
   a delay sensitivity of data to be scheduled.

3. The method of claim 1, wherein the scheduling grant includes the transport block size scaling factor.

4. The method of claim 1, wherein the method further comprises sending a configuration message to the user equipment, the configuration message comprising the transport block size scaling factor.

5. The method of claim 1, further comprising:
   encoding the transmission while using the transport block size scaling factor; and
   sending the transmission to the user equipment.

6. The method of claim 1, further comprising:
   receiving the transmission; and
   decoding the transmission while using the transport block size scaling factor.

7. The method of claim 6, further comprising sending HARQ information indicative of whether the decoding was successful or a failure.

8. The method of claim 7, further comprising obtaining a threshold for indicating a number of modulated symbols, wherein:
   the time spreading factor is determined such that the number of modulated symbols exceeds the threshold;
   the scheduling grant for the transmission is valid for the number of transmission timing intervals indicated by the time spreading factor; and
   the decoding is performed when the number of received modulated symbols exceeds the threshold.

9. The method of claim 1, further comprising obtaining a threshold for indicating a number of modulated symbols, wherein:
   the time spreading factor is determined such that the number of modulated symbols exceeds the threshold; and
   the scheduling grant for the transmission is valid for the number of transmission timing intervals indicated by the time spreading factor.

10. The method of claim 1, wherein the scheduling grant comprises a redundancy version indicator, and wherein the method further comprises mapping an extended redundancy version to the redundancy version indicator based on a transmission timing interval to which the scheduling grant relates.

11. The method of claim 10, wherein the method further comprises:
    receiving a further transmission in a further transmission timing interval; and
    determining a second extended redundancy version indicator based on the further transmission timing interval.

12. The method of claim 10, wherein the method further comprises:
    determining a second extended redundancy version indicator based on a further transmission timing interval for a further transmission; and
    sending the further transmission according to the determined second extended redundancy version indicator.

13. A method in a user equipment for receiving a scheduling grant for a transmission between the user equipment and a radio network node, the method comprising:
    receiving a transport block size scaling factor;
    determining a time spreading factor based on the received transport block size scaling factor, wherein the time spreading factor indicates a number of consecutive transmission time intervals over which the transmission is transmitted; and receiving a scheduling grant from the radio network node.

14. The method of claim 13, wherein the transport block size scaling factor is included in the scheduling grant.

15. The method of claim 13, wherein the method further comprises receiving a configuration message from the radio network node, wherein the configuration message comprises the transport block size scaling factor.

16. The method of claim 13, the method further comprising:
receiving the transmission; and
decoding the transmission while using the transport block size scaling factor.

17. The method of claim 16, further comprising sending HARQ information indicative of whether the decoding was successful or a failure.

18. The method of claim 17, further comprising obtaining a threshold for indicating a number of modulated symbols, wherein:
the time spreading factor is determined such that the number of modulated symbols exceeds the threshold;
the scheduling grant for the transmission is valid for the number of transmission timing intervals indicated by the time spreading factor; and
decoding is performed when the number of received modulated symbols exceeds the threshold.

19. The method of claim 13, wherein the scheduling grant comprises a redundancy version indicator, and wherein the method further comprises extracting an extended redundancy version from the redundancy version indicator based on a transmission timing interval to which the scheduling grant relates.

20. The method of claim 19, wherein the method further comprises:
determining a second extended redundancy version indicator based on a further transmission timing interval; and
sending a further transmission in the further transmission timing interval according to the second extended redundancy version indicator.

21. The method of claim 19, wherein the method further comprises:
receiving a further transmission according to a second extended redundancy version indicator in a further transmission timing interval; and
determining the second extended redundancy version indicator based on the further transmission timing interval.

22. The method of claim 13, the method further comprising:
encoding the transmission while using the transport block size scaling factor; and
sending the transmission.

23. The method of claim 13, further comprising obtaining a threshold for indicating a number of modulated symbols, wherein:
the time spreading factor is determined such that the number of modulated symbols exceeds the threshold; and
the scheduling grant for the transmission is valid for the number of transmission timing intervals indicated by the time spreading factor.

24. A radio network node configured to schedule transmission between the radio network node and a user equipment, the radio network node comprising:
a processing circuit configured to
determine a transport block size scaling factor,
determine a time spreading factor based on the transport block size scaling factor, wherein the time spreading factor indicates a number of consecutive transmission time intervals over which the transmission is to be transmitted, and
determine a scheduling grant for the transmission based on the transport block size scaling factor; and
a transmitter configured to send the transport block size scaling factor and the scheduling grant to the user equipment, whereby the scheduling grant schedules the transmission.

25. A user equipment configured to receive a scheduling grant for a transmission between the user equipment and a radio network node, the user equipment comprising a receiver configured to:
receive a transport block size scaling factor;
determine a time spreading factor based on the received transport block size scaling factor, wherein the time spreading factor indicates a number of consecutive transmission time intervals over which the transmission is transmitted; and
receive a scheduling grant from the radio network node.

* * * * *